United States Patent
Hoppe

(10) Patent No.: US 10,920,827 B2
(45) Date of Patent: Feb. 16, 2021

(54) BEARING SHELL AND DEVICE FOR MOLDING A BEARING SHELL

(71) Applicant: Hella GmbH & Co. KGaA, Lippstadt (DE)

(72) Inventor: Steffen Hoppe, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/319,867

(22) PCT Filed: Sep. 6, 2016

(86) PCT No.: PCT/EP2016/070941
§ 371 (c)(1),
(2) Date: Jan. 23, 2019

(87) PCT Pub. No.: WO2018/046074
PCT Pub. Date: Mar. 15, 2018

(65) Prior Publication Data
US 2019/0264743 A1  Aug. 29, 2019

(51) Int. Cl.
*F16C 17/02* (2006.01)
*F16C 33/20* (2006.01)

(52) U.S. Cl.
CPC ............ *F16C 33/208* (2013.01); *F16C 17/02* (2013.01); *F16C 33/20* (2013.01); *F16C 2220/04* (2013.01)

(58) Field of Classification Search
CPC .............. F16C 2220/04; F16C 2220/06; F16C 2220/08; F16C 17/02; F16C 17/26; F16C 33/04; F16C 33/046; F16C 33/14; F16C 33/20; F16C 33/208; F16C 29/02; F16C 27/02; B29C 33/485; B29C 33/76; B29L 2031/04; B29L 2031/045
See application file for complete search history.

(56) References Cited

U.S. PATENT DOCUMENTS

| 4,208,075 A | 6/1980 | Templeton |
| 5,757,588 A * | 5/1998 | Larson ................... F16C 33/20 360/265.2 |
| 2008/0144984 A1 | 6/2008 | Vogt et al. |
| 2009/0103840 A1 | 4/2009 | Hibi et al. |

FOREIGN PATENT DOCUMENTS

DE  19747792 A1  5/1999

* cited by examiner

*Primary Examiner* — Alan B Waits
(74) *Attorney, Agent, or Firm* — Husch Blackwell LLP

(57) ABSTRACT

A bearing shell comprising a body with a clearance hole defined by an inner wall of the body. The bearing shell further includes at least a first bearing surface and at least a second bearing surface. The first bearing surface is located on a first end and the second bearing surface is located on a second end of the body. In order to provide a bearing shell of simpler design, the first bearing surface and the second bearing surface, particularly shaped out of the body, are offset to each other in radial direction.

1 Claim, 3 Drawing Sheets

BEARING SHELL AND DEVICE FOR MOLDING A BEARING SHELL

CROSS REFERENCE

This application claims priority to PCT Application No. PCT/EP2016/070941, filed Sep. 6, 2016, the entirety of which is hereby incorporated by reference.

FIELD OF THE INVENTION

The present invention relates to a bearing shell, and to a device for molding a bearing shell.

BACKGROUND

From the DE 197 47 792 A1 a bearing shell, comprising a body with a clearance hole defined by an inner wall of the body, and further comprising a first bearing surface and a second bearing surface, whereat said first bearing surface is located on a first end and said second bearing surface is located on a second end of said body, is known.

Furthermore, a device for molding a bearing shell is known from the DE 197 47 792 A1, comprising a first mold core and a second mold core transferable between a working position inside a mold and a non-working position. In the working position of said first and said second mold core said mold cores are facing each other with at least one free end per mold core, whereat said free end of said first mold core is offset to said free end of said second mold core in radial direction and each of said mold cores is moveable in an opposite direction to its respective free end while transferred into said non-working position.

SUMMARY OF THE INVENTION

It is an object of the invention to provide a bearing shell of simpler design.

A main advantage of the bearing shell according to the invention is, that the bearing can be provided with two supporting points distanced from each other and, at the same time, can be manufactured more easily.

This is particularly true, if said first and said second bearing surfaces are shaped out of said body, because said bearing surfaces can be manufactured at the same time with said body.

A further object of the invention is to provide a device for molding such a bearing shell of less complexity.

This object of the invention is solved by a device for molding a bearing shell, wherein the radial distance of said outer contour of said free end of the respective mold core to a central axis of said mold core is less than the radial distance of said outer contour of the end of said mold core opposite to said free end to said central axis.

By using the device for molding a bearing shell according to the invention a main advantage is to enable a device of less complexity for the manufacturing of a bearing shell according to the invention. Only two mold cores and a two-part mold are necessary for manufacturing a bearing shell subject to the invention. No such things like slides are necessary.

Moreover, corrections are easy to achieve. For example, compared to a hole drilled afterwards.

Further advantageous developments of the bearing shell according to the invention and the device for molding a bearing shell according to the invention are apparent from the sub-claims as well as from the following description of exemplary embodiments of the bearing shell according to the invention by means of the attached Figures.

Basically, the body of the bearing shell can be of any material, outer and inner shape and dimension. Advantageously, said body is built like a bush, particularly with a circular or near-circular outer contour of the cross section of said bush. That way, the body can easily be inserted into other parts. Furthermore, a device for molding such a body is quite easy to manufacture.

In general, the first bearing surface and the second bearing surface can be of any material, shape, dimension and position relative to the body or to the rest of the body. Favorably, said first bearing surface and said second bearing surface are alternating to each other, substantially along a whole inner contour of the body defined by the clearance hole.

Thus, the projection of said first and said second bearing surfaces onto a projection plane parallel to a cross section of the bearing shell displays, that said first and said second bearing surfaces are positioned alternately around the inner contour of the body, preferably along the complete inner contour of the body.

A further advantageous development of the bearing shell according to the invention is, that each of said at least two first bearing surfaces and said at least two second bearing surfaces define a circular or near-circular shaped seat and inner diameters of both circular or near-circular shaped seats are substantially equal to each other. That way, the manufacture of the bearing shell according to the invention as well as a bearing, comprising the bearing shell and a bearing shaft, are further simplified. Using a bearing shell and a bearing shaft with a simple circular cross section is possible, too.

Basically said first and said second bearing surfaces can be of any number. Advantageously, three first bearing surfaces and three second bearing surfaces are located on said body. This is, because three bearing surfaces on each end of said body of the bearing shell ensure to keep the counterpart, namely the bearing shaft, in place.

Particularly preferable is, that said bearing surfaces on each end of said body are equal distanced to each other.

In general, said first and said second bearing surface can be of any spatial orientation. Favorably, said first bearing surface and said second bearing surface are each substantially equal distanced to a central axis of said clearance hole. That way, an easy build bearing is further promoted.

A favorable development of the bearing shell according to the aforementioned embodiment is, that an inner width of said clearance hole at the radial position of said first bearing surface and at the radial position of said second bearing surface is smaller than at the opposite end of the body at the radial position of the respective first and second bearing surface. Hereby, the manufacture of the bearing shell according to the invention is further simplified.

An advantageous development of the aforementioned embodiment is, that sections of said inner wall of said body, linking said first bearing surface and said second bearing surface with said opposite end of the body at the radial position of the respective first and second bearing surface, run continuously. That way, a draft angle is easily realized.

Analog to the advantageous development of the bearing shell mentioned before, the sections of outer walls of said first and said second mold core, linking said free end and said opposite end at the radial position of said free end of the respective mold core, run continuously.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
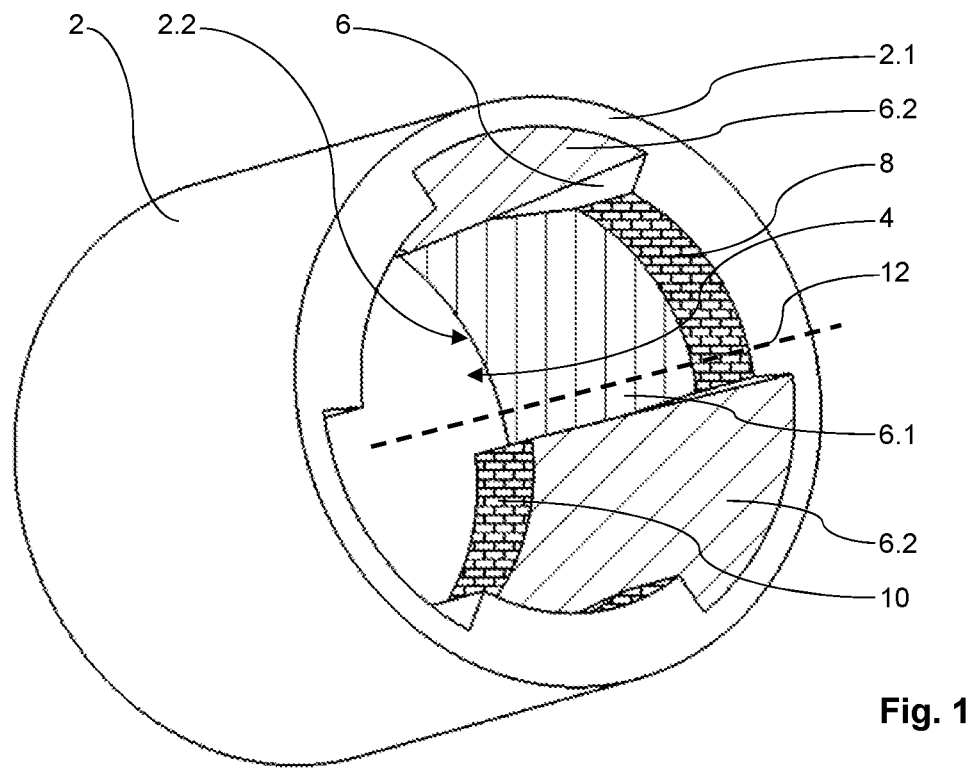
FIG. 1 is a first embodiment of a bearing shell according to the invention in a perspective view.

FIG. 1 displays a first embodiment of the bearing shell according to the invention comprising a body 2 out of a plastic material with a clearance hole 4 defined by an inner wall 6 of the body 2, and further comprising three first bearing surfaces 8 and three second bearing surfaces 10, whereat the first bearing surfaces 8 are located on a first end 2.1 and the second bearing surfaces 10 are located on a second end 2.2 of the body 2.

Figure 2:
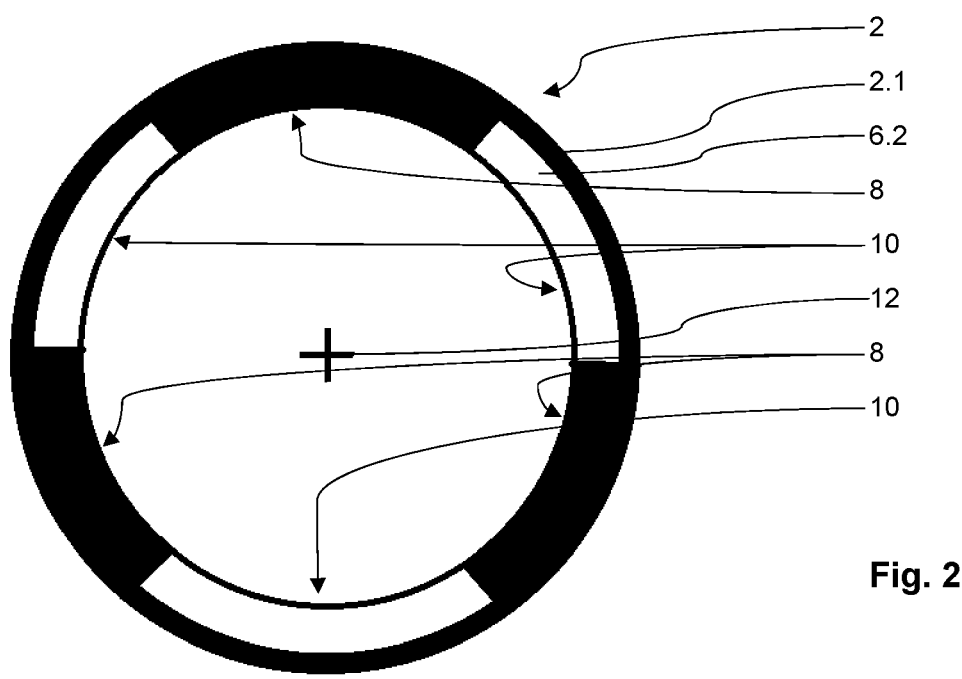
FIG. 2 illustrates said first embodiment in a projection plane view.

Said first bearing surfaces 8 and said second bearing surfaces 10 are shaped out of the body 2 and are offset to each other in radial direction, which can also be seen in FIG. 2.

The body 2 is built like a bush 2, comprising a circular outer contour of the cross section of the bush 2. See also FIG. 2.

In FIGS. 1 and 2 it is also displayed, that the first bearing surfaces 8 and said second bearing surfaces 10 are alternating to each other. The first and second bearing surfaces 8, 10 are positioned along a whole inner contour of the bush 2 defined by the clearance hole 4.

This can be seen most easily with reference to FIG. 2, displaying a projection of the three first bearing surfaces 8 and the three second bearing surfaces 10 in a projection plane parallel to a cross section of the bush 2. After a first bearing surface 8 positioned on the first end 2.1 of the bush 2 a second bearing surface 10 follows, which is positioned on the second end 2.2 of the bush 2, and so on.

It is also visible from FIG. 2, that the three first bearing surfaces 8 define a circular shaped seat on the first end 2.1 of the bush 2 and the three second bearing surfaces 10 define a circular shaped seat on the second end of the bush 2. Inner diameters of both circular shaped seats are substantially equal to each other.

Said first bearing surfaces 8 and said second bearing surfaces 10 are each substantially equal distanced to a central axis 12 of said clearance hole 4. The central axis 12 is indicated by a broken line in FIG. 1 and an intersection of a cross in FIG. 2. Thus, the central axis 12 runs perpendicular to the drawing plane of FIG. 2.

In the first embodiment, the distances of the three first bearing surfaces 8 and of the three second bearing surfaces 10 to the central axis 12 are equal, too. Thus, a bearing shaft with a constant diameter can be used. The bearing shaft is not displayed.

In this embodiment, an inner width of said clearance hole 4 at the radial positions of said first bearing surfaces 8 and at the radial positions of said second bearing surfaces 10 is smaller than at the opposite end 2.1, 2.2 of the bush 2 at the radial positions of the respective first and second bearing surfaces 8, 10.

Thus, the inner width of said clearance hole 4 at the radial positions of the first bearing surfaces 8 is smaller than of the opposite end 2.2 of the bush 2 at the radial positions of the first bearing surfaces 8.

In other words, the inner width of sections of the clearance hole 4 at the second end 2.2 of the bush 2, which are covered in FIG. 2 by the first end 2.1 at the radial positions of the first bearing surfaces 8 is taller than the inner width of the clearance hole 4 at the first end 2.1 at the radial positions of the first bearing surfaces 8.

The same is true for said second bearing surfaces 10 and the opposite end 2.1 of the bush 2 at the radial positions of the second bearing surfaces 10.

Furthermore, sections 6.1 and 6.2 of said inner wall 6 of said bush 2, linking said first bearing surfaces 8 and said second bearing surfaces 10 with said opposite end 2.2, 2.1 of the bush 2 at the radial positions of the respective first and second bearing surfaces 8, 10, run continuously.

This can be seen best from FIG. 1.

For example, the inner wall 6 is equally distanced to the central axis 12 of the clearance hole 4 with respect to the first bearing surfaces 8, which are part of the inner wall 6 of the bush 2.

Following the sections 6.1 of the inner wall 6 beginning at the ends of the first bearing surfaces 8, which are positioned opposite to the first end 2.1 of the bush 2 and running towards the second end 2.2 of the bush 2, it can be seen, that this sections 6.1 are descending in a constant angle. In FIG. 1 only one of sections 6.1 is visible.

The same is true with respect to the second bearing surfaces 10, but in the opposite direction compared to the previous explanation.

Thus, the inner wall 6 beginning at the ends of the second bearing surfaces 10, which are positioned opposite to the second end 2.2 of the bush 2 and running towards the first end 2.1 of the bush 2, it can be seen, that this sections 6.2 are descending in a constant angle, too. In FIG. 1 only two of sections 6.2 are visible.

Figure 3:
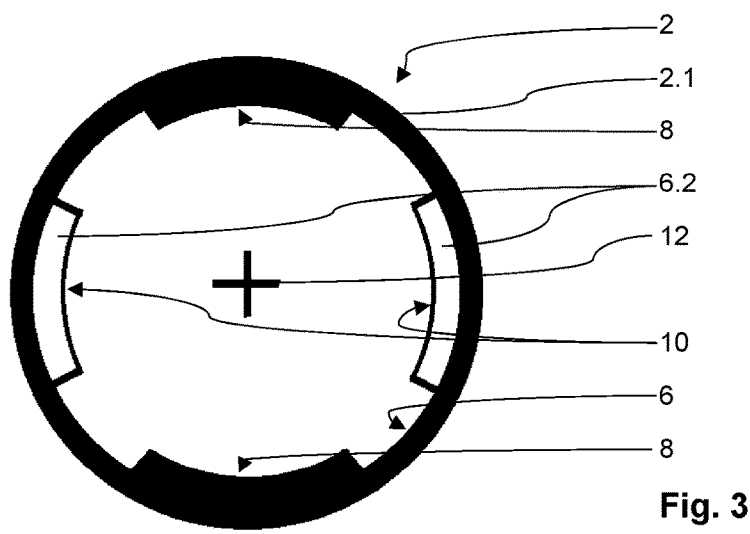
FIG. 3 is a second embodiment of a bearing shell according to the invention in a second projection plane view.
Figure 4:
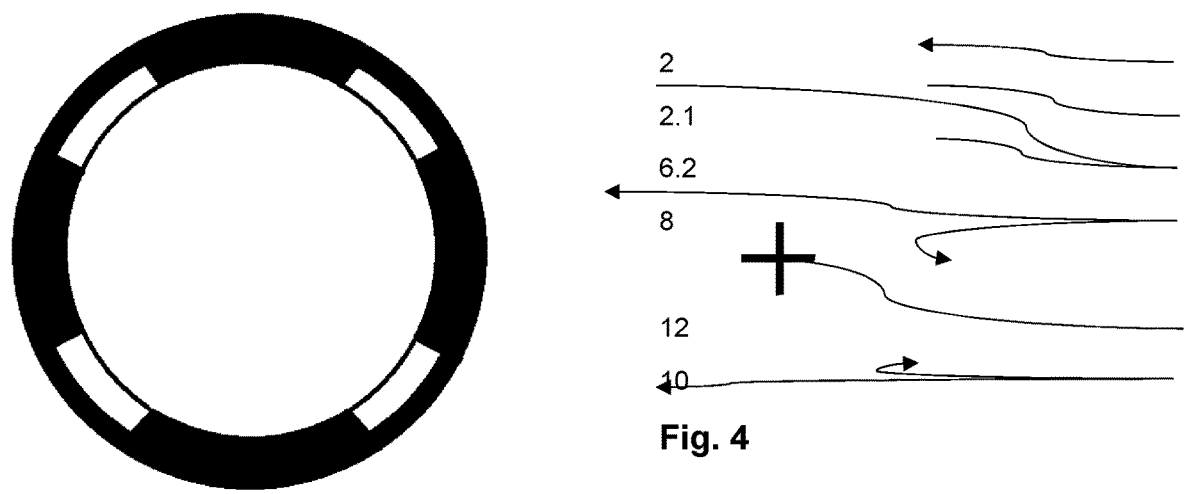
FIG. 4 is a third embodiment of a bearing shell according to the invention in a third projection plane view.
Figure 5:
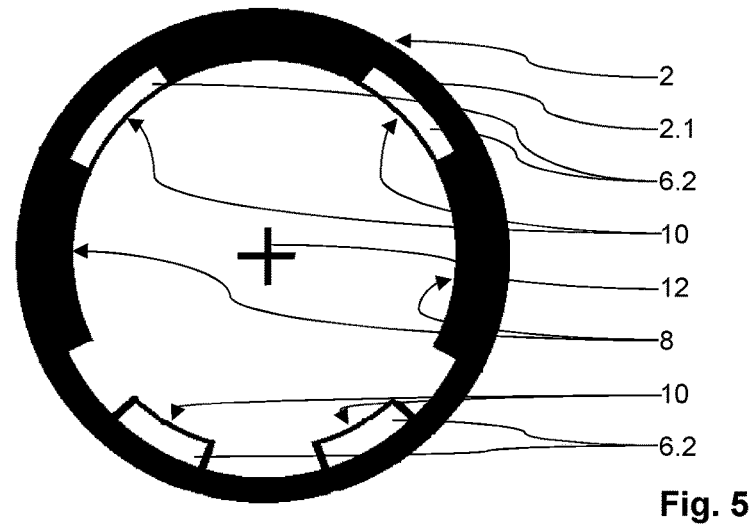
FIG. 5 is a fourth embodiment of a bearing shell according to the invention in a fourth projection plane view

FIG. 3 to FIG. 5 show three more embodiments of bearing shells according to the invention. In the following, only the differences between these embodiments and the first embodiment are discussed.

In FIG. 3 only two first bearing surfaces 8 and only two second bearing surfaces 10 are used. Unlike the first embodiment, in the second embodiment the neighboring first and second bearing surfaces 8, 10 are—with respect to the projection plane view of FIG. 3—not in contact with each other. There are gaps between neighboring first and second bearing surfaces 8, 10.

FIG. 4 shows a third embodiment with four first bearing surfaces 8 and four second bearing surfaces 10. Analog to the first embodiment, the neighboring first and second bearing surfaces 8, 10 are—with respect to the projection plane view of FIG. 4—in contact with each other.

Furthermore, FIG. 5 displays a fourth embodiment with an uneven number of first and second bearing surfaces 8, 10. Here, three first bearing surfaces 8 and four second bearing surfaces 10 are used.

The two second bearing surfaces 10, which are positioned on the upper side of the projection plane view of FIG. 4 are—with respect to said view—in contact with the neighboring first bearing surfaces 8, whereas the two second bearing surfaces 10, which are positioned on the lower side of said view, are not in contact with the neighboring first bearing surfaces 8.

The first and second bearing surfaces 8, 10 of the embodiment of FIG. 5 are not arranged at regular intervals, in order to take care of an asymmetrical load.

Thus, the arrangement of the first and second bearing surfaces 8, 10 could be of any useful kind, symmetrical or asymmetrical, with an even or uneven number of first and second bearing surfaces, with the same or different numbers of first and second bearing surfaces and with first and/or second bearing surfaces pooled in certain areas.

The four embodiments of bearing shells according to the invention are only examples.

The invention is not limited to the exemplary embodiments discussed before.

Of course, there are other arrangements of first and second bearing surfaces possible. The person skilled in the art will choose the right arrangement depending on the field of application.

Figure 6:
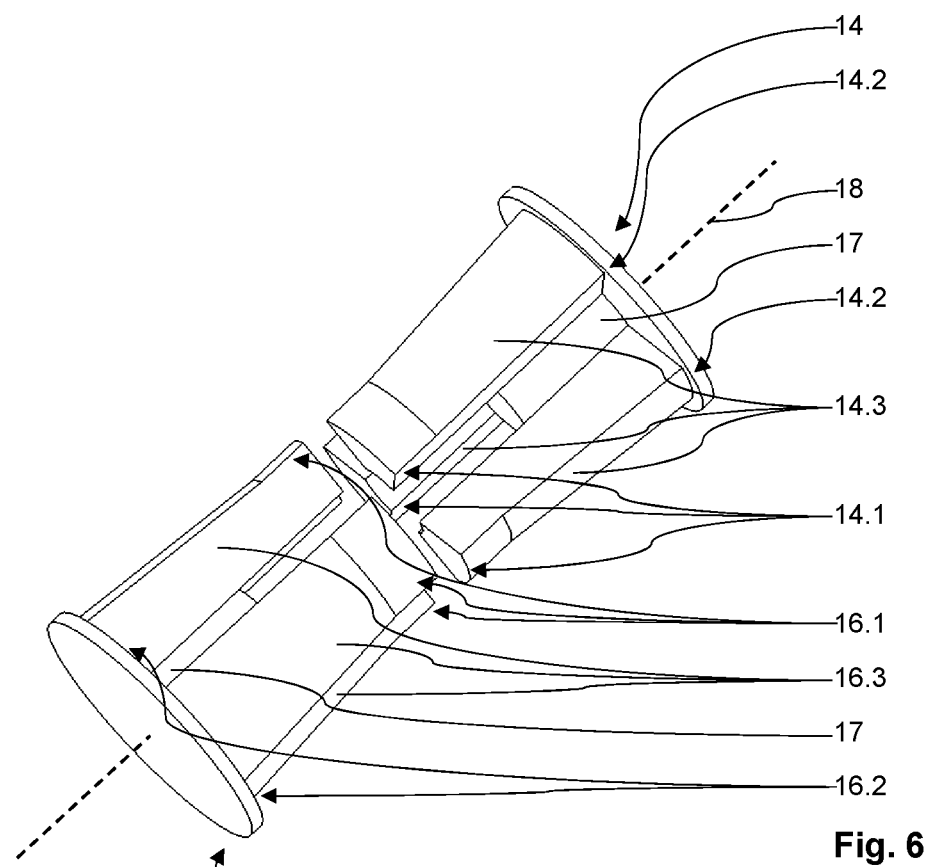
FIG. 6 illustrates two mold cores of a device for molding a bearing shell according to the invention in a non-working position.
Figure 7:
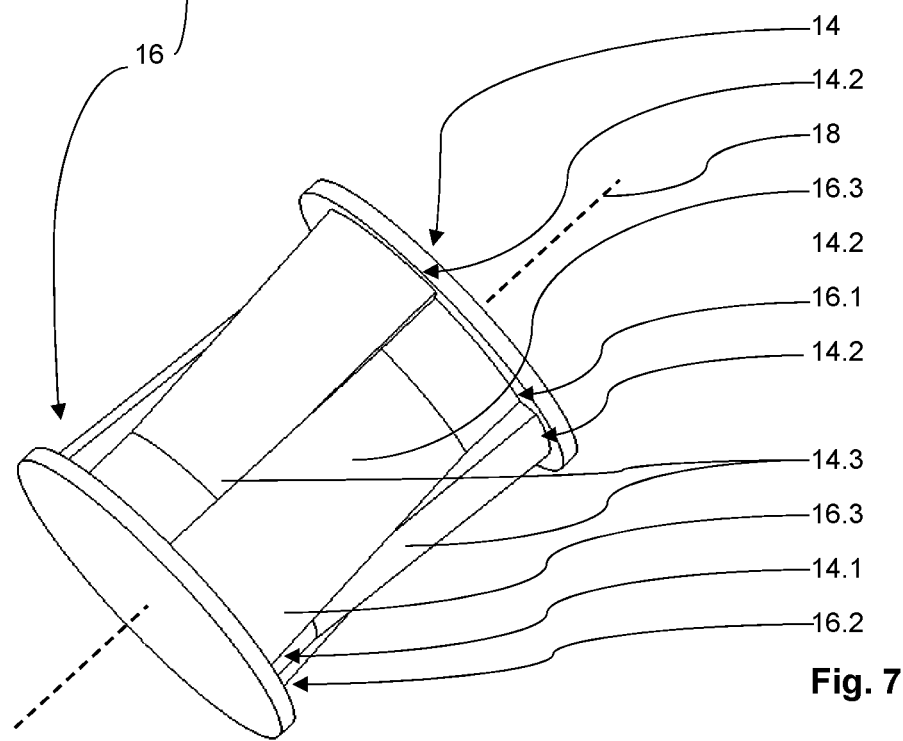
FIG. 7 illustrates the two mold cores of FIG. 6 in a working position.

FIGS. 6 and 7 display a first mold core 14 and a second mold core 16 of a device for molding a bearing shell according to the invention and with respect to the bearing shell according to FIGS. 1 and 2.

Even if a device for molding a bearing shell according to the invention is not displayed in the Fig., it can be explained with the above mentioned Fig. dealing with the bearing shell according to the invention and with the FIGS. 6 and 7.

In order to manufacture a bearing shell according to the invention and with respect to the first embodiment of the bearing shell displayed in FIGS. 1 and 2, the device for molding the bearing shell comprises the first mold core 14 and the second mold core 16 transferable between a working position inside a mold and a non-working position, whereas FIG. 6 shows the two mold cores 14, 16 in a non-working position and FIG. 7 shows the two mold cores 14, 16 in the working position.

The two mold cores 14, 16 are facing each other with three free ends 14.1 and 16.1 per mold core 14, 16 in said working position, whereat said free ends 14.1 of said first mold core 14 are offset to said free ends 16.1 of said second mold core 16 in radial direction and each of said mold cores 14, 16 is moveable in an opposite direction to its respective free ends 14.1, 16.1 while transferred into said non-working position.

For example, such an arrangement can also be seen from the mentioned DE 197 47 792 A1, FIGS. 1 to 3 and FIGS. 6 to 10.

Someone has just to imagine the two mold cores 14, 16 inserted in a mold for molding the bearing shell displayed in FIG. 1. The two mold cores 14, 16, which are displayed, are inserted in the mold, which is not displayed, in order to build the bush 2 with the clearing hole 4 after the material is inserted into the mold.

Thus, the two mold cores 14, 16 are the negative form of the bush 2 of the first embodiment and the three free ends 14.1 of the first mold core 14 correspond to the three first bearing surfaces 8 of the bush 2 and the three free ends 16.1 of the second mold core 16 correspond to the three second bearing surfaces 10 of the bush 2.

Each of the two mold cores 14, 16 contain a dome 17 in its center. The domes 17 stabilize the mold cores 14, 16.

Firstly, each dome 17 reinforces the finger-like projections 14.3, 16.3 of the mold core 14, 16, linking the free end 14.1, 16.1 and the end 14.2, 16.2 of the mold core 14, 16 opposite to the free end 14.1, 16.1 and at the same radial position of the respective free end 14.1, 16.1.

Secondly, each dome 17 supports the finger-like projections 14.3, 16.3 of the other mold core 14, 16 during the transformation of the two mold cores 14, 16 in the working position displayed in FIG. 7. Thus, the finger-like projections 14.3, 16.3 are guided and positioned by the dome 17 of the other mold core 14, 16.

The three free ends 14.1 of the first mold core 14 are placed at the radial and axial positions of the later first bearing surfaces and the three free ends 16.1 of the second mold core 16 are placed at the radial and axial positions of the later second bearing surfaces.

After the hardening of the material in the mold, the two mold cores 14, 16 are withdrawn from the bush 2 by pulling each mold core 14, 16 parallel to the central axis 12 and in the direction opposite to the three free ends 14.1, 16.1 of the respective mold core 14, 16 out of the clearance hole 4 of the bush 2.

This is possible, because of the fact, that unlike the DE 197 47 792 A1, the device for molding a bearing shell according to the invention also comprises, that the radial distance of an outer contour of said free ends 14.1, 16.1 of the respective mold core 14, 16 to a central axis 18 of said mold core 14, 16 is less than the radial distance of an outer contour of an end 14.2, 16.2 of said mold core 14, 16 opposite to and at the radial position of said free ends 14.1, 16.1 to said central axis 18. This can be derived from FIG. 1 as well as from FIGS. 6 and 7.

In order to enhance the transfer into the non-working position, sections of outer walls of said two mold cores 14, 16, linking said free ends 14.1, 16.1 and said opposite ends 14.2, 16.2 at the radial positions of said free ends 14.1, 16.1 of the respective mold core 14, 16, run continuously. The sections ascend at a constant angle from the three free ends 14.1, 16.1 of each mold core 14, 16 to the opposite end 14.2, 16.2 at the radial positions of said free ends 14.1, 16.1.

Instead of using a plastic material for the bearing shell other suitable materials can be used, too. The same is true for the counterpart, the bearing shaft. For example, plastic materials, ceramics, glass, compound materials, metals and alloys are possible.

Instead of casting or injection molding, sintering as well as materials used for sintering would be possible, too.

The bearing shell and the bearing shaft have not to be manufactured from the same material or group of materials. For example, the bearing shell can be made from a plastic material and the bearing shaft can be made from a metal, e.g. steel.

Furthermore, the space between the first and the second bearing surfaces can be used for sealing, e.g. by inserting an O-ring gasket.

Moreover, the bearing shell according to the invention can be designed with different kinds of lubrication, namely using lubricants from an external source, like oil or grease, using lubricants contained by the bearing shell, like bronze or graphite, or using bearing shells made of materials that are the lubricant.

For example, if using lubricants from an external source the bearing shell comprises channels for delivering oil or another lubricant to the relevant position of the bearing shell.

The first and second bearing surfaces have not to be equal distanced to each other as well as to the bearing surfaces on the opposite end of the bearing shell.

A smaller number of first and second bearing surfaces, for example two first and two second bearing surfaces or less, is maybe suitable for bearings with only a smaller degree of rotation and not a 360° rotation of the bearing shaft.

The first and second bearing surfaces have not to be shaped out from the body of the bearing shell, but can be molded separately. This is advantageous, if there is a need for having different materials for the body and the first and/or second bearing surfaces.

The bearing shaft and therefore the first and second bearing surfaces have not to define a circular or near-circular shaped seat and the inner diameters of both circular or near-circular shaped seats have not to be substantially equal to each other. Polygon shaped and other non-circular shaped seats built by the first and second bearing surfaces are possible, too.

The bearing shell and device for molding a bearing shell according to the invention are especially advantageous for high volume production, because of no reworking of the bearing shell is necessary.

The invention is favorable for all kinds of bearing shells and devices for molding a bearing shell which require a kind of draft angle.

LIST OF REFERENCE NUMBERS 2 body, built like a bush
2.1 first end of body 2
2.2 second end of body 2
4 clearance hole
6 inner wall of body 2
6.1 section of inner wall 6, linking the first bearing surface 8 and the opposite end 2.2 of body 2 at the radial position of the respective first bearing surface 8
6.2 section of inner wall 6, linking the second bearing surface 10 and the opposite end 2.1 of body 2 at the radial position of the respective second bearing surface 10
8 first bearing surface
10 second bearing surface
12 central axis of clearance hole 4
14 first mold core
14.1 free end of the first mold core 14
14.2 end of first mold core 14 opposite to free end of first mold core 14
14.3 finger-like projection of first mold core 14
16 second mold core
16.1 free end of the second mold core 16
16.2 end of second mold core 16 opposite to free end of second mold core 16
16.3 finger-like projection of second mold core 16
17 domes
18 central axis of the mold cores 14, 16

The invention claimed is:

1. A device for molding a bearing shell, the device comprising:
a first mold core and a second mold core, said first and second mold cores being transferable between a working position inside a mold and a non-working position and facing each other with at least one free end per mold core in said working position,
wherein said free end of said first mold core is circumferentially opposite to said free end of said second mold core in radial direction and each of said mold cores is moveable in an opposite direction to its respective free end while transferred into said non-working position,
wherein the radial distance of an outer contour of said free end of the respective mold core to a central axis of said mold core is less than the radial distance of an outer contour of an end of said mold core opposite to and at the radial position of said free end to said central axis.

* * * * *